(12) United States Patent
Pfof et al.

(10) Patent No.: US 10,250,125 B2
(45) Date of Patent: *Apr. 2, 2019

(54) POWER SUPPLY CONTROLLER AND RELATED METHODS

(71) Applicant: SEMOCONDUCTOR COMPONENTS INDUSTRIES, LLC, Phoenix, AZ (US)

(72) Inventors: Zdenek Pfof, Olomouc (CZ); Jiri Bubla, Roznov pod Radhostem (CZ); Ivo Vecera, Roznov pod Radhostem (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/868,690

(22) Filed: Jan. 11, 2018

(65) Prior Publication Data

US 2018/0138807 A1    May 17, 2018

Related U.S. Application Data

(63) Continuation of application No. 15/094,061, filed on Apr. 8, 2016, now Pat. No. 9,876,421.

(Continued)

(51) Int. Cl.
  *H02M 1/32* (2007.01)
  *H02M 1/36* (2007.01)
  *H02M 1/00* (2006.01)

(52) U.S. Cl.
  CPC .............. *H02M 1/32* (2013.01); *H02M 1/36* (2013.01); *H02M 2001/0006* (2013.01); *H02M 2001/0035* (2013.01); *Y02B 70/16* (2013.01)

(58) Field of Classification Search
  CPC .. H02M 1/32; H02M 1/36; H02M 2001/0003; H02M 2001/0035; Y02B 70/16

(Continued)

(56) References Cited

U.S. PATENT DOCUMENTS 5,056,398 A    10/1991  Adamson
5,642,244 A *   6/1997  Okada .................... G11B 19/02
                                                          360/46

(Continued)

OTHER PUBLICATIONS

"TEA1732TS GreenChip SMPS control IC Product Data Sheet," published online at least as early as Sep. 24, 2015 by NXP Semiconductors Netherlands N.V., available online at http://www.nxp.com/documents/data_sheet/TEA1732TS.pdf, last visited Sep. 24, 2015.

(Continued)

*Primary Examiner* — Yemane Mehari
(74) *Attorney, Agent, or Firm* — IPTechLaw

(57) ABSTRACT

A power supply controller having a shortened reset time due to a small hiccup voltage includes an electrical circuit providing a repeated voltage hiccup of a supply voltage of the controller of a switched-mode power supply (SMPS) when the controller enters a latched state. A plurality of comparators each have an input coupled with the controller supply voltage. A multiplexer and two latches are included, each coupled with one or more comparator outputs, and a restart controller is coupled with an output of one of the latches. The restart controller in various implementations toggles a switch to activate and deactivate a current sink to create the supply voltage hiccup. In other implementations, the switch is excluded and the restart controller toggles a voltage startup transistor to couple and decouple a voltage source with the supply voltage to create the voltage hiccup.

20 Claims, 9 Drawing Sheets

Related U.S. Application Data

(60) Provisional application No. 62/239,818, filed on Oct. 9, 2015.

(58) Field of Classification Search
USPC .......................................................... 363/50
See application file for complete search history.

(56) References Cited

U.S. PATENT DOCUMENTS

| | | | | |
|---|---|---|---|---|
| 8,461,872 | B2* | 6/2013 | Whetsel | H03K 19/01759 |
| | | | | 326/86 |
| 9,876,421 | B2* | 1/2018 | Pfof | H02M 1/32 |
| 2009/0152949 | A1* | 6/2009 | Adragna | H02J 1/102 |
| | | | | 307/31 |
| 2010/0195776 | A1 | 8/2010 | Chmelar | |
| 2012/0034894 | A1 | 2/2012 | Chan | |
| 2017/0192449 | A1* | 7/2017 | Payne | G06F 1/04 |

OTHER PUBLICATIONS

"NCP1256 Low Power Offline PWM Current Mode Controller with Brown-Out Protection," published online by Semiconductor Components Industries, LLC of Schaumburg, IL, at least as early as Sep. 24, 2015, available online at http://www.onsemi.com/pub_link/Collateral/NCP1256-D.PDF, last visited Sep. 24, 2015.

"FAN6756-mWSaverTM PWM Controller," published online by Fairchild Semiconductor Corporation at least as early as Sep. 24, 2015, available online at https://www.fairchildsemi.com/datasheets/FA/FAN6756.pdf, last visited Sep. 24, 2015.

Christophe Basso, "Power Design: Reducing Wasted Startup Current in Offline Supplies," published online by Power Electronics Technology at least as early as Oct. 2, 2015, available at http://powerelectronics.com/site-files/powerelectronics.com/files/archive/powerelectronics.com/mag/408pet07_web.pdf, last visited Oct. 2, 2015.

NCP1256 Internal VCC and Logic Management diagram of power supply controller on sale in the U.S. at least as early as Oct. 5, 2015 by Semiconductor Components Industries, LLC of Schaumburg, IL.

* cited by examiner

POWER SUPPLY CONTROLLER AND RELATED METHODS

CROSS REFERENCE TO RELATED APPLICATIONS

This document claims the benefit of the filing date of U.S. Provisional Patent Application 62/239,818, entitled "Power Supply Controller and Related Methods" to Zdenek Pfof which was filed on Oct. 9, 2015, the disclosure of which is hereby incorporated entirely herein by reference.

This application is a continuation application of the earlier U.S. Utility patent application to Zdenek Pfof entitled "Power Supply Controller and Related Methods," application Ser. No. 15/094,061, filed Apr. 8, 2016, now pending, the disclosure of which is hereby incorporated entirely herein by reference.

BACKGROUND

1. Technical Field

Aspects of this document relate generally to power supply controllers. Specific aspects of this document relate to switched-mode power supply controllers.

2. Background Art

A power supply provides electric energy to a load. Power supplies may be controlled with a controller, and both the power supply and controller can be formed in a single packaged semiconductor device or may be separately packaged. A switched-mode power supply (SMPS) is one example of a power supply.

SUMMARY

Implementations of power supply controllers may include: an electrical circuit configured to provide a repeated voltage hiccup of a supply voltage of a power supply controller of a switched-mode power supply (SMPS) when the power supply controller is in a latched state, the electrical circuit including: a first comparator, a second comparator, a third comparator, and a fourth comparator, each of the four comparators having an input coupled with the supply voltage of the power supply controller; a multiplexer having a first input coupled with an output of the first comparator, the multiplexer also having a second input coupled with an output of the second comparator; a first latch having a first input coupled with an output of the multiplexer, the first latch also having a second input coupled with an output of the third comparator; a second latch having an input coupled with an output of the fourth comparator; a restart controller having an input coupled with an output of the first latch, and; a switch toggled by the restart controller between a closed state and an open state to alternately decrease and increase the supply voltage, respectively, to create the repeated voltage hiccup.

Implementations of power supply controllers may include one, all, or any of the following:

The electrical circuit may not include a Zener diode coupled with the supply voltage of the power supply controller.

The multiplexer may be controlled by an output signal of the second latch.

The second latch may have a second input receiving a latch_in signal, the latch_in signal having a first value when the power supply controller is in the latched state and a second value when the power supply controller is in a non-latched state.

A high voltage start-up transistor may be included and may be configured to couple a high voltage source with the supply voltage in response to a signal from the restart controller.

Implementations of power supply controllers may include: an electrical circuit configured to provide a repeated voltage hiccup of a supply voltage of a power supply controller of a switched-mode power supply (SMPS) when the power supply controller is in a latched state, the electrical circuit including: a first comparator, a second comparator having a built-in hysteresis, and a third comparator, each of the three comparators having an input coupled with the supply voltage of the power supply controller; a multiplexer having a first input coupled with an output of the first comparator, the multiplexer also having a second input coupled with an output of the second comparator; a first latch having a first input coupled with an output of the multiplexer, the first latch also having a second input coupled with the output of the second comparator; a second latch having an input coupled with an output of the third comparator; a restart controller having an input coupled with an output of the first latch, and; a switch toggled by the restart controller between a closed state and an open state to alternately decrease and increase the supply voltage, respectively, to create the repeated voltage hiccup.

Implementations of power supply controllers may include one, all, or any of the following:

The electrical circuit may not include a Zener diode coupled with the supply voltage of the power supply controller.

The multiplexer may be controlled by an output signal of the second latch.

The second latch may include a second input receiving a latch_in signal, the latch_in signal having a first value when the power supply controller is in the latched state and a second value when the power supply controller is in a non-latched state.

A high voltage start-up transistor may be included and may be configured to couple a high voltage source with the supply voltage in response to a signal from the restart controller.

The second input of the multiplexer may be coupled with the output of the second comparator through an inverter, the inverter receiving a signal from the second comparator and outputting an inverted signal to the multiplexer.

Implementations of power supply controllers may include: an electrical circuit configured to provide a repeated voltage hiccup of a supply voltage of a power supply controller of a switched-mode power supply (SMPS) when the power supply controller is in a latched state, the electrical circuit including: a first comparator, a second comparator, a third comparator, and a fourth comparator, each of the four comparators having an input coupled with supply voltage of the power supply controller; a multiplexer having a first input coupled with an output of the first comparator, the multiplexer also having a second input coupled with an output of the second comparator; a first latch having a first input coupled with an output of the multiplexer, the first latch also having a second input coupled with an output of the third comparator; a second latch having an input coupled with an output of the fourth comparator; a restart controller having an input coupled with an output of the first latch, and; a voltage start-up transistor toggled by the restart controller between an on state and an off state to alternately couple and decouple a voltage source with the supply voltage to alternately increase and decrease the supply voltage, respectively, to create the repeated voltage hiccup; wherein, when the voltage start-up transistor is off, the supply voltage decreases through internal current consumption via an internal resistance of the power supply controller.

Implementations of power supply controllers may include one, all, or any of the following:

The electrical circuit may not include a Zener diode coupled with the supply voltage of the power supply controller.

The multiplexer may be controlled by an output signal of the second latch.

The second latch may include a second input receiving a latch_in signal, the latch_in signal having a first value when the power supply controller is in the latched state and a second value when the power supply controller is in a non-latched state.

Implementations of power supply controllers may include: an electrical circuit configured to provide a repeated voltage hiccup of a supply voltage of a power supply controller of a switched-mode power supply (SMPS) when the power supply controller is in a latched state, the electrical circuit including: a first comparator, a second comparator having a built-in hysteresis, and a third comparator, each of the three comparators having an input coupled with the supply voltage of the power supply controller; a multiplexer having a first input coupled with an output of the first comparator, the multiplexer also having a second input coupled with an output of the second comparator; a first latch having a first input coupled with an output of the multiplexer, the first latch also having a second input coupled with the output of the second comparator; a second latch having an input coupled with an output of the third comparator; a restart controller having an input coupled with an output of the first latch, and; a voltage start-up transistor toggled by the restart controller between an on state and an off state to alternately couple and decouple a high voltage source with the supply voltage to alternately increase and decrease the supply voltage, respectively, to create the repeated voltage hiccup; wherein, when the voltage start-up transistor is off, the supply voltage decreases through internal current consumption via an internal resistance of the power supply controller.

Implementations of power supply controllers may include one, all, or any of the following:

The electrical circuit may not include a Zener diode coupled with the supply voltage of the power supply controller.

The multiplexer may be controlled by an output signal of the second latch.

The second latch may have a second input receiving a latch_in signal, the latch_in signal having a first value when the power supply controller is in the latched state and a second value when the power supply controller is in a non-latched state.

The second input of the multiplexer may be coupled with the output of the second comparator through an inverter, the inverter receiving a signal from the second comparator and outputting an inverted signal to the multiplexer.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended power supply controllers and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such power supply controllers and related methods, and implementing components and methods, consistent with the intended operation and methods.

Examples of systems and devices related to power systems and controllers may be found in "NCP1256 Low Power Offline PWM Current Mode Controller with Brown-Out Protection," (NCP1256/D), Rev. 1 (August 2015), published online by Semiconductor Components Industries, LLC of Schaumburg, Il. at least as early as Sep. 24, 2015, the disclosure of which is hereby incorporated entirely herein by reference.

Figure 1:
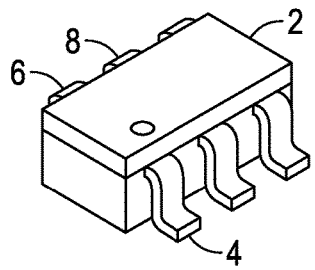
FIG. 1 is a perspective view of an implementation of a power supply controller.

Referring now to FIG. 1, in implementations a power supply controller (controller) 2 is a packaged semiconductor device having a plurality of leads or pins, such as a ground pin 4, a driver pin 6, a supply voltage pin (VCC pin or VDD pin) 8, and so forth. The controller could also have a leadless design, instead of having pins. The VCC pin is coupled with a supply voltage VCC or VDD. The power supply could be any type of power supply, such as a switched-mode power supply, and the controller 2 in implementations may be a pulse width modulation (PWM) controller. The controller 2, may, by non-limiting example, control a power metal-oxide-semiconductor field-effect transistor (MOSFET).

Figure 2:
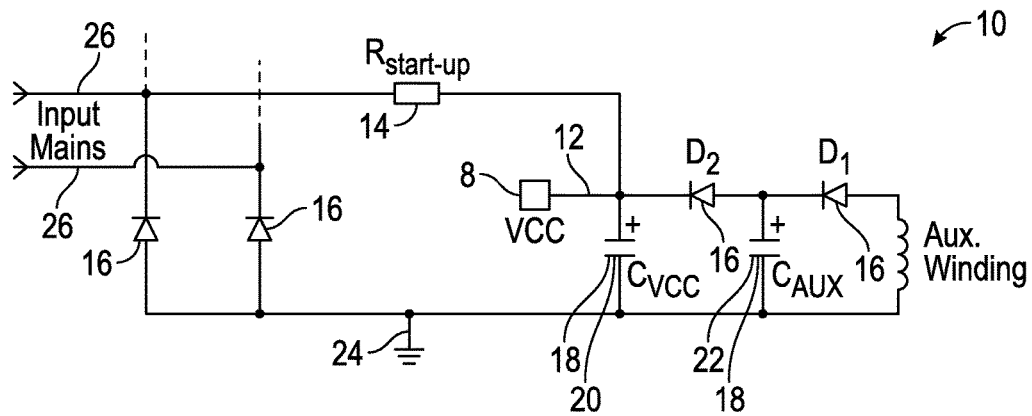
FIG. 2 is a diagram of an implementation of an external electrical circuit of a power supply controller.

FIG. 2 shows a representative example of an electrical circuit 10 used to power the controller 2. During steady state operation the controller is powered with an auxiliary winding, shown in FIG. 2. Prior to steady state operation a startup procedure occurs as follows. A startup resistor 14 is used together with input mains 26 to charge a capacitor 18 (CVCC 20). During startup the controller may draw a minimal amount of current. The charging of capacitor CVCC may be seen in FIG. 4, which illustrates the voltage VCC steadily rising linearly until it reaches a VCC(on) value. When the voltage across CVCC reaches the specified VCC(on) threshold the controller begins pulsing and its consumption increases, which may be seen by the sudden drop in VCC on the graph concurrent with the pulsing of the DRV pin shown on the lowermost portion of the graph of FIG. 4. A ground 24 is also shown in FIG. 2.

Figure 4:
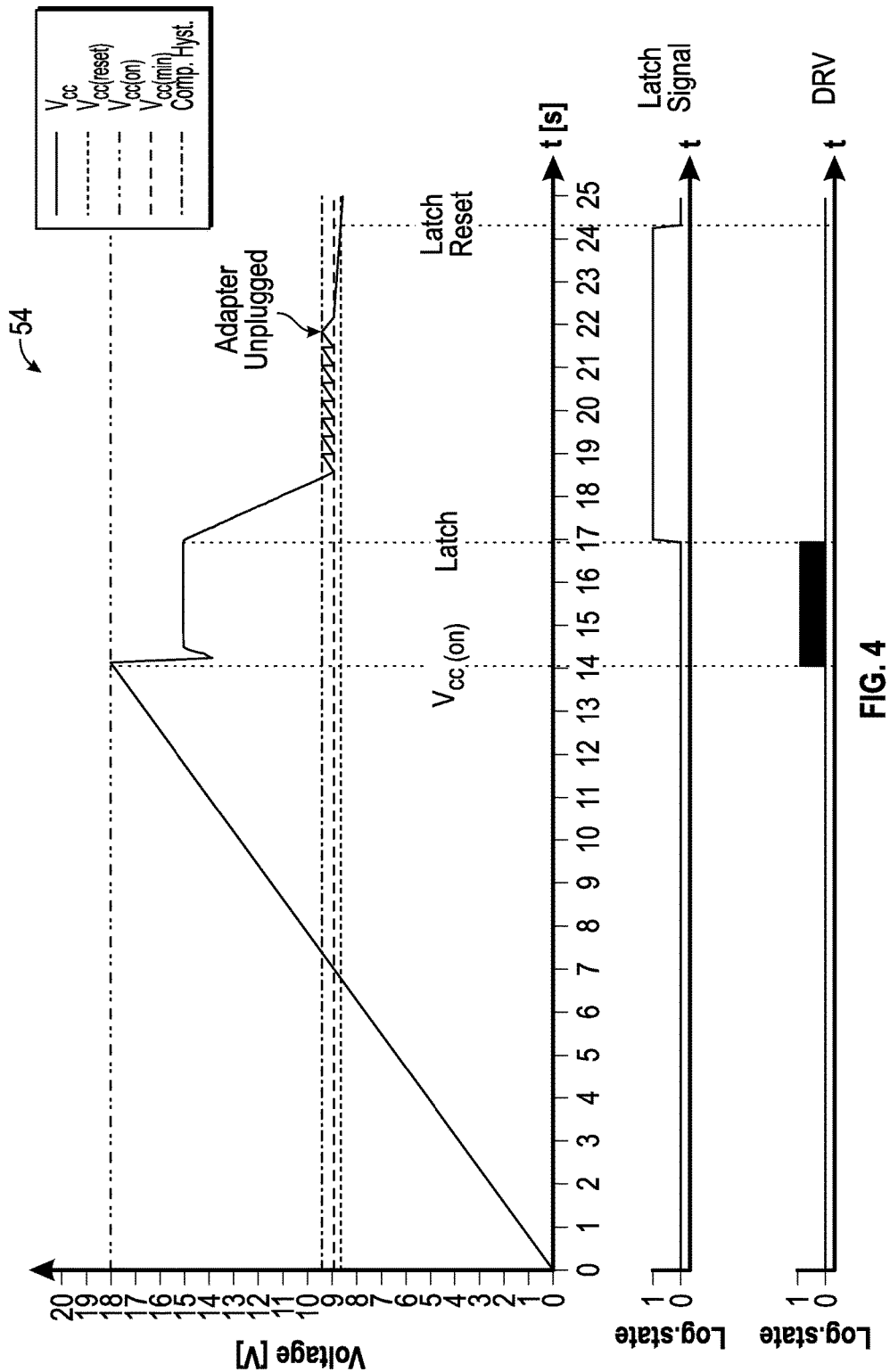
FIG. 4 is a graph illustrating behavior of the electrical circuit of FIG. 3.

Although the pulsing of the signal communicated via the DRV pin appears to be represented as a solid dark block in FIG. 4, a close-up view would reveal a series of pulses. For ease of illustration they are illustrated as a single black block in FIG. 4—but the versions in FIGS. 6, 8, 11, 13, 15, and 17 more clearly show the pulsing on the DRV pin. Once the pulsing begins, the current from resistor 14 becomes negligible and the controller is powered by the CVCC capacitor until steady-state operation, during which the auxiliary winding coupled with CVCC through one or more diodes 16 fully supplies energy to the controller.

If at some point the power supply becomes overheated, overloaded, experiences an overvoltage, or in any other way enters a fault state, the controller 2 is configured to enter a latched state to protect the power supply by stopping the DRV pulses. During the latched state a repeated voltage hiccup is realized on the supply voltage (VCC) 12 line, which in implementations is a way of self-supplying the controller when there is no energy from the auxiliary winding (due to the missing DRV pulses). This is accomplished in a variety of ways in various implementations, as will be described hereafter. To exit the latched state the VCC voltage needs to drop to a reset level VCC(reset). This is generally accomplished when the power supply is unplugged from an outlet or other power source, but because the capacitors CVCC and/or CAUX 22 need to drain sufficiently for the VCC value to fall to VCC(reset), in conventional power supply controllers, the reset time has sometimes been more than a few seconds (in some cases up to or more than ten seconds depending on the voltage level of VCC at the time of unplugging and the configurations of CVCC and CAUX). In some cases where the CVCC capacitance is 4.7 micro Farads the reset time may be greater than 7 seconds if the device was unplugged while VCC was near 18 V. When the CAUX capacitor is present its capacitance may be 47 micro Farads, which may add more than 2 additional seconds to the reset time (which adds up to the over ten second estimate above). The reset time may be dependent not only on capacitance values but also on the discharge current value(s).

Naturally, there are variations among conventional power supply controllers. In some cases the CAUX capacitor has much greater capacitance than the CVCC capacitor and both must be discharged from VCC(min) to VCC(reset). In some cases the ratio of the capacitance of CVCC to CAUX is, or is about, 1 to 10. This ratio may result in a greater reset time.

In conventional power supply controllers having such configurations, as described, the reset time could be very long (more than 10 seconds).

If the controller has entered a latched state and a user unplugs the power supply and then plugs it back in before the capacitors have sufficiently drained to bring VCC to the reset value (fairly likely if more than a few seconds is required) the controller will remain in the latched state when the power supply is plugged back in. Because the controller failed to exit the latched state soon enough, the user may be frustrated because the controller still does not work even after it was unplugged and plugged back in. The power supply controller implementations disclosed herein are designed to allow the reset value VCC(reset) to be reached quickly after unplugging the power supply, as will be discussed herein.

Figure 3:
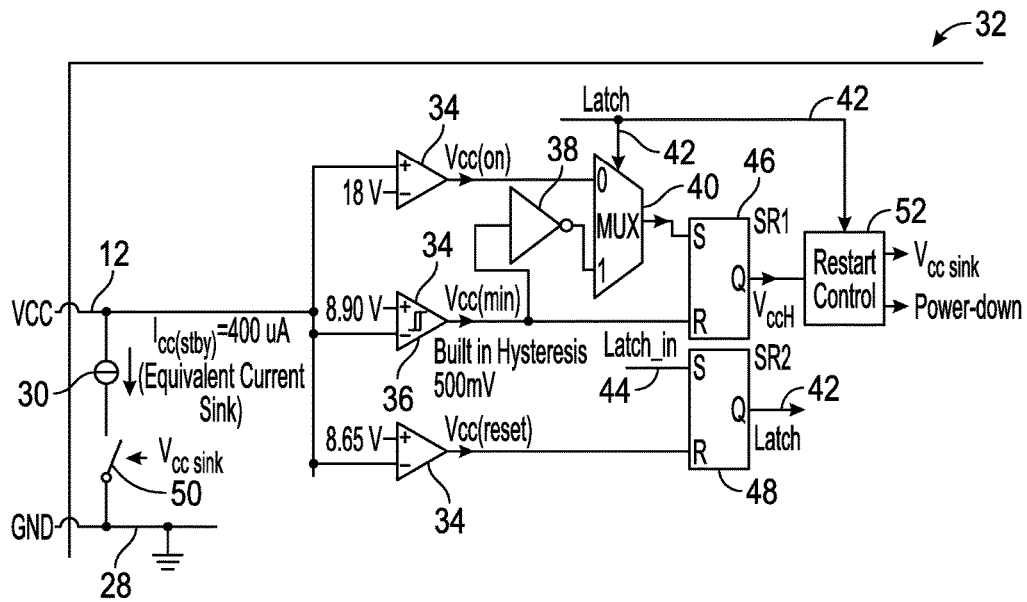
FIG. 3 is a diagram of an implementation of an internal electrical circuit of a power supply controller.

Referring now to FIG. 3, a diagram of an electrical circuit (circuit) 32 of a power supply controller is shown. The behavior of this electrical circuit is represented by the graph 54 of FIG. 4. Electrical circuit 32 includes three comparators 34, each having an input coupled with the supply voltage (VCC) 12. One of these comparators is a comparator 36 with a built-in hysteresis behavior. A multiplexer (MUX) 40 is also included and has two inputs. One of these is coupled with an output of the first (or top) comparator, and the second input is coupled with an output of the second (or middle) comparator (i.e., the comparator with built-in hysteresis) through an inverter 38 so that the signal output from the second comparator is inverted before reaching the multiplexer. A first latch 46 (SR1) has two inputs and the output from the multiplexer is coupled with one of the inputs while the output from the comparator with hysteresis (non-inverted) is coupled with the second input. A second latch 48 (SR2) includes a first input which receives a signal indicative of whether the controller is in a latched state (latch_in signal 44, or latch input signal) and the second input of the second latch receives an output of the third (bottom) comparator.

A restart controller 52 has an input coupled with an output of the first latch and controls a switch 50 which, when activated, causes the supply voltage VCC to decrease due to the current sink 30. The restart controller may further perform a variety of other functions. For example, the restart controller may be used to disable the switching of the DRV pin to stop the power output of the power supply during the latched state and/or during a restart initiation. In some cases a fault may trigger the controller to, instead of entering a latched state, simply restart (or turn off and power up again—during which restart time the DRV pin would naturally cease pulsing and the power supply would accordingly be off). In implementations the restart controller is configured to cause the controller to enter the latched state when there is an overvoltage or overtemperature fault, while an overpower, undervoltage, brown out, or maximum duty cycle fault causes the restart controller to initiate a restart instead of latching. Other configurations are possible.

During a restart the controller enters a power down mode, during which the CVCC capacitor is discharged and then recharged via the startup resistor until the VCC start-up level is reached. In some cases the restart sequence that discharges and recharges the CVCC capacitor may be repeated a number of times, depending on the cause of the restart, before the DRV pin begins switching again. If the mains voltage is below a brownout level for a predetermined amount of time the restart controller may be configured to stop switching the DRV pin and initiate a restart. If the power supply repeats a predetermined number of maximum duty cycle strokes the restart controller may be configured to initiate a restart. Furthermore, the controller may allow an overload for a predetermined amount of time. When the overload starts, an internal timer of the controller and/or restart controller may begin. If the overload continues for longer than a predetermined time the restart controller may initiate a restart.

Figure 5:
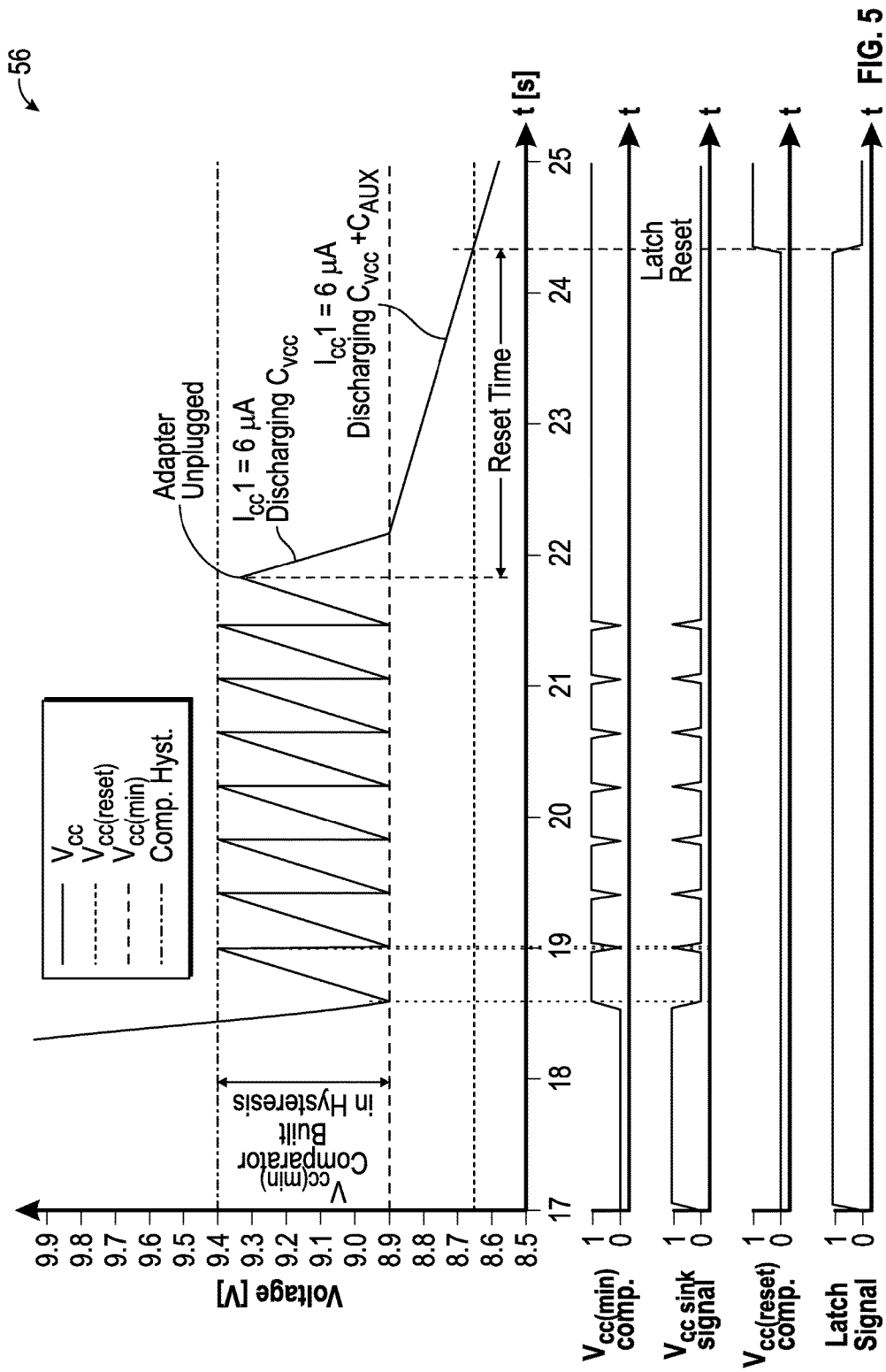
FIG. 5 is a graph illustrating behavior of the electrical circuit of FIG. 3.
Figure 6:
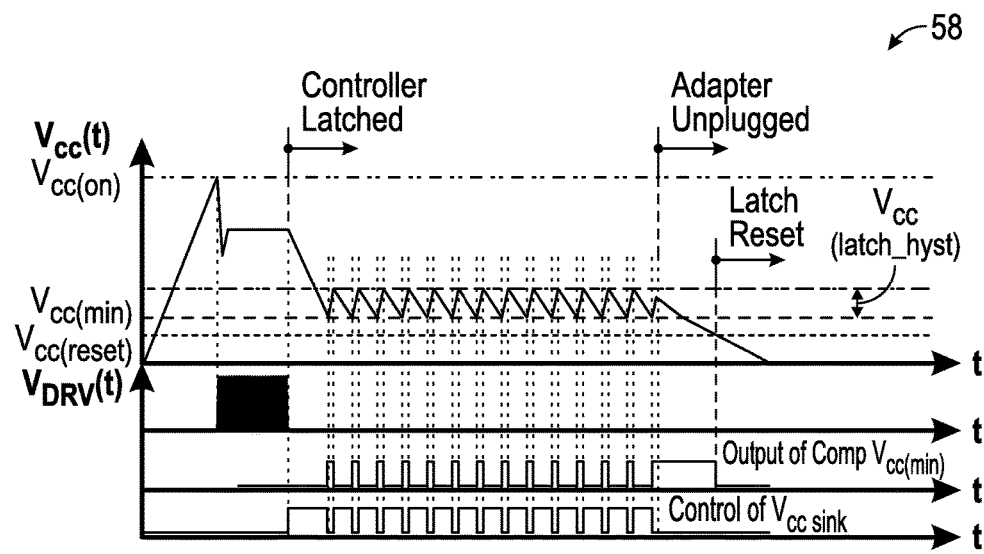
FIG. 6 is a graph illustrating behavior of the electrical circuit of FIG. 3.

Referring to FIGS. 3-5, the latched and non-latched states will now be described in more detail. When the controller is not in a latched state during normal operation, the latch_in signal 44 (latch input signal) entering the S line of SR2 is 0, and the signal from the VCC(reset) comparator is 0 because the VCC voltage is greater than 8.65 V. Accordingly, latch signal 42 output from latch SR2 is 0. This is the same latch signal 42 that is shown being routed to the multiplexer and the restart controller (notwithstanding their not being shown connected in the drawings). The latch signal 42 controls the multiplexer. Accordingly, when the latch signal is 0, the multiplexer accepts the signal from the VCC(on) comparator, which signal will be 0 because the VCC voltage will be lower than 18 V. This signal is then output from the multiplexer to the S input line of the SR1 latch. At the same time, because the VCC voltage is greater than 8.90 V, the output signal from the VCC(min) comparator is 0, thus the S and R lines of SR1 are both 0, and the output signal VCCH from SR1 to the restart controller is accordingly 0. The latch signal 42 to the restart controller 52 is also 0. During this condition the restart controller, in response to receiving a VCCH signal of 0 and latch signal 42 of 0, outputs a VCC sink signal of 0, which leaves the switch 50 in the open configuration, as shown in FIG. 3.

When a fault condition occurs with the power supply (overheating, overloading, etc.) the latch_in signal changes to 1. The S and R lines of SR2 are then 1 and 0, respectively, and the SR2 latch value is accordingly set to 1 so that latch signal 42 is 1 (this may be seen in the middle graph of FIG. 4 and the bottom graph of FIG. 5). As this signal controls the multiplexer, the multiplexer then only accepts the signal at its 1 input. As the VCC voltage starts out greater than 8.90 V, the VCC(min) comparator will output a 0 but this signal will be inverted using inverter 38 so that a 1 signal is input to the multiplexer and this 1 signal will be output to the S line of the SR1 latch. The R line of the SR1 latch will receive the 0 signal of the VCC(min) comparator, and thus the S and R lines of the SR1 latch will be 1 and 0, respectively, changing the VCCH signal to 1. The restart controller will then receive the latch signal 42 of 1 and the VCCH signal of 1 and will, in response to receiving these signals, output a VCC sink signal of 1 (shown in the VCC sink signal graph in FIG. 5) which will cause the switch 50 to close, coupling VCC with the ground (GND) 28 through the current sink 30. This will result in the VCC voltage dropping due to the current sink 30. When the voltage drops below 8.90 V the output signal from the VCC(min) comparator will change to 1 (which can be seen in the VCC(min.) comp. graph of FIG. 5), which signal will be inverted through the inverter to 0 and passed to the S line of SR1, thus the S and R lines of SR1 will be 0 and 1, respectively, which will reset the SR1 latch so that it outputs the VCCH signal of 0. The restart controller will thus receive a latch signal 42 of 1 and a VCCH signal of 0 and will, in response, output a VCC sink signal of 0 (as seen in the VCC sink signal graph of FIG. 5) which will open the switch 50, causing the VCC voltage to rise again.

The VCC(min) comparator has a hysteresis of 500 mV, thus it creates two switching points, one for rising voltages and one for falling voltages, 500 mV apart. The falling voltage switching point is 8.90 V, as described above, but the rising switching point is 9.40 V due to the 500 mV hysteresis. When the switch 50 is open the VCC voltage rises due to low current consumption of the controller (which in implementations is as low as 6 micro amps and is equivalent to the start-up current which in some cases needs to be as low as possible). When the VCC voltage rises above 9.40 V the VCC(min) output signal switches again to 0, which results in closing switch 50, until the VCC voltage drops below 8.90 V again. As can be seen, this switching happens in a very small fraction of a second, as can be seen from FIG. 5, and in this manner the VCC supply voltage is toggled between the VCC(min) value of 8.9 V and 9.4 V, which is the comparator hysteresis (shown as Comp. Hyst. on the graph) to achieve the voltage hiccup.

Other hysteresis values could be used and the hysteresis may change with temperature. For example VCC(min) could have a hysteresis of 480 mV at room temperature, 300 mV at a low temperature and 700 mV at a high temperature. But various hysteresis values, and comparator values, may be chosen by the practitioner of ordinary skill in the art according to the desired function. However, given the relatively small variation of the hysteresis voltage in comparison with the magnitude of the VCC voltage itself, these temperature effects may not affect the performance of the circuit.

When the power supply is unplugged the VCC voltage drops, draining the capacitors as previously described, and needs to reach the VCC(reset) value of 8.65 V for the controller to reset and exit the latched state. Because the comparators as described above have kept the VCC voltage toggling between values that are relatively close to 8.65 V (i.e., between 8.9 V and 9.4 V), which may be referred to as a "small hiccup," it does not take very long for the capacitors to drain so that the VCC voltage drops to 8.65 V (in FIG. 5 it is shown to drop from above 9.3 V at the point of unplugging to 8.65 V in about 2.5 seconds, or at the most less than 3 seconds). Thus, when a user unplugs the power supply, the supply voltage VCC quickly drops below 8.65 V. Referring still to FIGS. 3-5, the VCC(reset) comparator signal then changes to 1. The latch_in signal in in this implementation may just be a short impulse (and this may be the case with any of the controller implementations disclosed herein), so that at this point the latch_in signal may be absent (or may be a zero effectively), and the R input of 1 would toggle the latch signal 42 to 0. In other implementations the R input of the SR latch is simply dominant so that when a 1 is received at R the output signal of SR2 is toggled, or the latch could be a JK latch or have a similar configuration so that S and R inputs of 1 and 1 toggle the latch. In either case, the SR2 output value of latch signal 42 then toggles to 0. Thus when the user plugs the power supply in again the controller is no longer in the latched state, the latch_in signal is also toggled to 0, and thus the power supply can function normally. In various implementations, the reset time may accordingly have very low dependency on temperature and component manufacturing process spread.

As is shown in FIG. 5, when the power supply is unplugged, the VCC discharge rate in terms of Volts/second is related whether just CVCC or CVCC+CAUX must be discharged. Discharged current in some implementations is a constant 6 micro amps in either case. The change in the discharge rate shown in FIG. 5 is caused by the fact that at a certain VCC level (VCC(min)) both capacitors CVCC and CAUX are being discharged instead of just CVCC.

Naturally, the details described above are only for one representative implementation. Various other logic elements, various switch types, various comparator hysteresis values, various flip flop switch types (SR NOR, SR NAND, JK, gated SR, gated D, Earle, T, etc.), and so forth, may be utilized in various implementations of an electrical circuit for the power supply controller to achieve the quick reset time. Similarly, in some cases an inverter may be omitted and/or various of the described elements could be replaced with other logic elements that accomplish the same or similar functions. The current sink 30 is shown in FIG. 3 as having a current consumption of 400 micro amps, though in other implementations current sinks drawing more or less current may be used.

Referring again to FIG. 4, in conjunction with the above described behavior, it may be seen that at the point at which an adapter (AC to DC converter) is unplugged (such as a power supply for a laptop computer, a mobile charger, or the like), the VCC voltage drops until it reaches the "latch reset" point at the VCC(reset) voltage, and the latch signal graph also shown in FIG. 4, which shows a latch signal of 1 at the beginning of the latched state, now at the latch reset point switches back to 0. As can also be seen from FIG. 4, as soon as the latched state is entered, the DRV pin ceases pulsing so that the power supply ceases supplying power to the load.

As described somewhat already, FIG. 5 shows a graph 56 which includes a close-up view of the VCC voltage during the latched state. Below the voltage graph are, in the following order going down, a graph of the output of the VCC(min) comparator versus time, a graph of the VCC (sink) signal from the restart controller to the switch 50 versus time, a graph of the output of the VCC(reset) comparator signal versus time, and the latch signal 42 versus time. The signals appear to transition in a gradual manner from the sloping of the lines on the graphs but in reality the values are just toggling between 1 and 0, and this is more clearly represented in the bottom of graph 58 shown in FIG. 6, where the VCC(min) comparator output is seen toggling between 0 (bottom value) and 1 (top value) during the latched state and the VCC sink signal from the restart controller is correspondingly seen toggling between 1 (top value) and 0 (bottom value) during the latched state. In some implementations the output of the VCC(min) comparator remains a 1 signal after the adapter is unplugged (which may be due to the VCC voltage not rising to the 9.4 V after the last dip to below 8.90 V) until the latch reset occurs at 8.65 V, at which point the VCC(min) output may return to 0.

Figure 7:
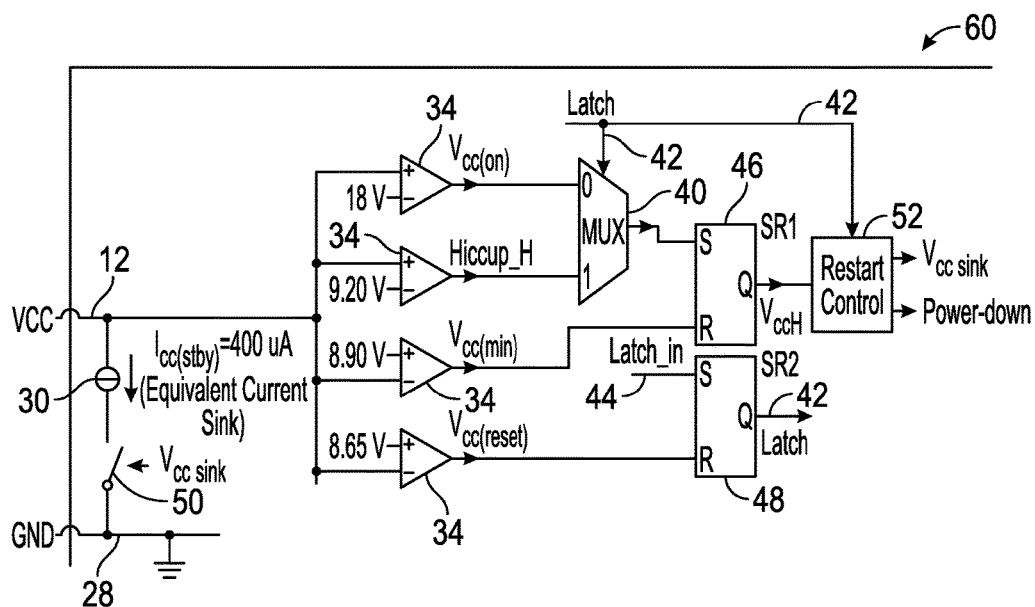
FIG. 7 is a diagram of an implementation of an internal electrical circuit of a power supply controller.

FIG. 7 shows an electrical circuit 60 which is similar in some ways to electrical circuit 32 except that the inverter is omitted and the comparator with hysteresis is replaced with two comparators. The functioning of this circuit is in many way similar to that described above with respect to electrical circuit 32. The comparators may be chosen so that their threshold values are very close to one another, and close to the reset voltage, to accomplish the small hiccup behavior. When in the non-latched state during normal operation the latch_in signal is 0, the signal from VCC(reset) is 0 to do the VCC voltage being greater than 8.65 V, and thus the latch signal 42 is 0, the multiplexer, which is controlled by the latch signal 42, thus only allows the signal at its 0 input to pass through. The signal from the VCC(on) comparator is 0 because the VCC voltage is lower than 18 V, so this signal passes through the multiplexer into the S line of SR1. At the same time, the VCC(min) output signal is 0 because the VCC voltage is greater than 8.90 V. Thus the VCCH signal output from SR1 is 0, and the restart controller 52 thus receives the latch signal 42 of 0 and the VCCH signal of 0 and, in response, sends a VCC sink signal of 0 to the switch 50, which maintains the switch 50 in an open configuration, as shown in FIG. 7.

When a fault condition occurs, such as an overheating, overloading, etc., the latch_in signal entering the S line of SR2 changes to 1. The S and R lines of SR2 are then 1 and 0, respectively, so the latch signal 42 changes to 1. This then controls multiplexer 40 so that only the 1 input passes through, which is output from the Hiccup_H comparator. Because the VCC voltage will be greater than 9.20 V, the signal output from Hiccup_H will be 1, and this signal will pass through the multiplexer so the input on the S line of latch SR1 will be 1, while the input on the R line of SR1 will remain 0 because the VCC voltage will be above 8.90 V. Thus the S and R lines of SR1 will be 1 and 0, respectively, and the VCCH signal will change to 1. The restart controller, in response to receiving a VCCH signal of 1 and a latch signal 42 of 1 will output a VCC sink signal of 1, which will close switch 50. The VCC voltage will then drop due to the current sink 30.

When the VCC voltage drops below 9.20 V (but still above 8.90 V) the output signal of the Hiccup_H comparator will change to 0, thus the S and R lines of SR1 will be 0 and 0, which will not change the output of latch SR1, so the switch 50 will remain closed and the VCC voltage will continue to drop. Once the VCC voltage drops below 8.90 V the VCC(min) comparator output signal will change to 1, so the S and R lines of the SR1 latch will be 0 and 1, respectively, which will reset the SR1 latch so that the output signal VCCH is 0. The restart controller, in response to receiving a latch signal 42 of 1 and a VCCH signal of 0, will output a VCC sink signal of 0, so that the switch 50 opens. The VCC voltage will then rise.

The VCC voltage will rise above 8.90 V, which will change the output of the VCC(min) comparator to 0, so that the S and R lines of the SR1 latch will be 0 and 0, respectively, and thus the output signal VCCH will not change but will remain 0. The VCC sink signal will accordingly remain 0, and the switch 50 will remain open and the VCC voltage will continue to rise. Once the VCC voltage rises above 9.20 V, the output signal of the Hiccup_H comparator will change to 1, so that the S and R lines of the SR1 latch will be 1 and 0, respectively. This will set the SR1 latch so that the VCCH output value is 1. The restart controller, in response to receiving the latch signal 42 of 1 and the VCCH signal of 1, will output a VCC sink signal of 1, thus closing the switch 50 and draining the VCC voltage back down. Thus, the presence of the comparators in the configuration illustrated in FIG. 7 will toggle the VCC voltage between 9.20 V and 8.90 V during the latched state.

Figure 8:
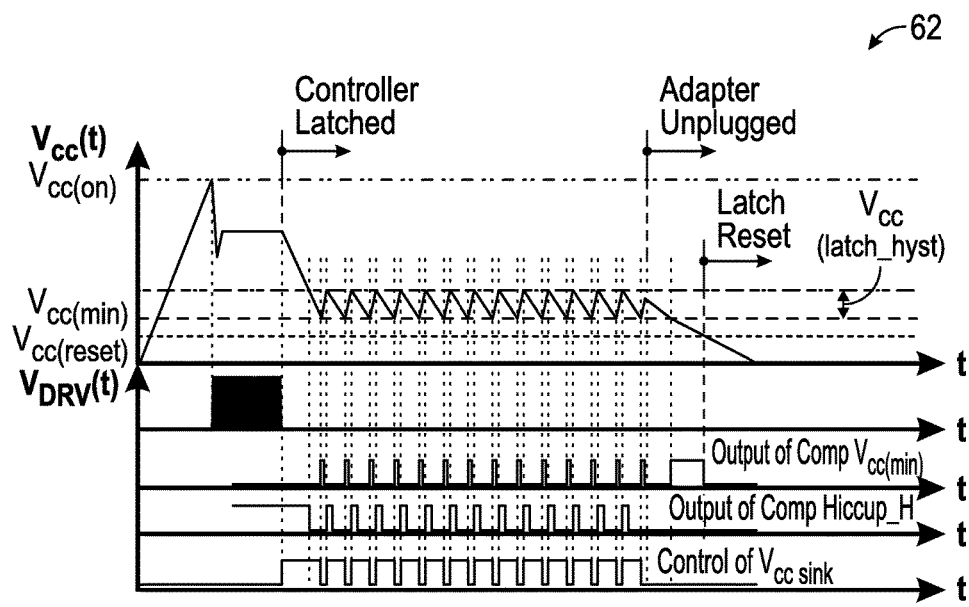
FIG. 8 is a graph illustrating behavior of the electrical circuit of FIG. 7.

FIG. 8 shows a graph 62 which plots VCC voltage versus time along with the output of the VCC(min) comparator, Hiccup_H comparator, and the VCC sink signal (for these latter three the high values are 1 and the low values are 0). The supply voltage VCC thus toggles between VCC(min) and the Hiccup_H value, which range is depicted in FIG. 8 by the VCC (latch hyst) label. Although there is no comparator with hysteresis used in this example, the configuration of the comparators accomplishes a similar outcome as that described above for the electrical circuit 32 where a comparator with hysteresis is used.

As can be seen in graph 62, in some implementations the output of the VCC(min) comparator may be 1 from the time the VCC voltage drops to below 8.90 V after the power supply is unplugged and until the reset voltage of 8.65 V is reached.

The remaining behavior of the electrical circuit 60 is similar to that described above for electrical circuit 32. Naturally, any of the values may be changed, such as the values of the reference voltages supplied to the comparators, the current sink amperage, and so forth. And, as with any of the other implementations of controllers described herein, all of the logic elements could be reversed (0s and 1s), and/or other logic elements could be used which accomplish the same or similar results.

It may be noted for electrical circuit 60 (as well as electrical circuit 32 and other electrical circuits disclosed herein), that during the startup phase of the controller the latch_in signal will be 0, the latch signal 42 will be 0, and thus the multiplexer will forward the VCC(on) signal to the first latch SR1. When the VCC voltage rises above 18 V the VCC(on) output signal will switch from 0 to 1, and this will pass through multiplexer 40 so that the S and R lines of the SR1 latch will be 1 and 0, respectively. This would set the SR1 latch so that the VCCH output signal is 1. The restart controller, in response to receiving a latch signal 42 of 0 and a VCCH signal of 1 may then begin pulsing the DRV pin to turn on the power supply.

Figure 9:
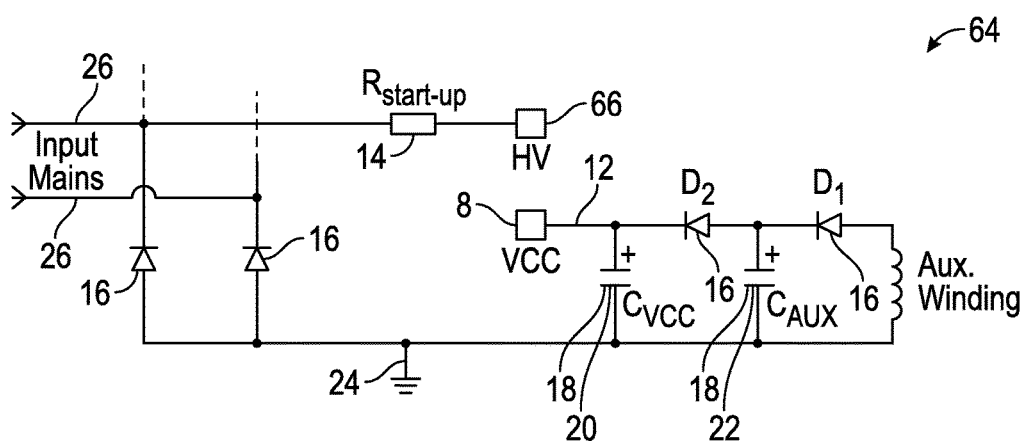
FIG. 9 is a diagram of an implementation of an external electrical circuit of a power supply controller.

FIG. 9 shows an electrical circuit (circuit) 64 somewhat similar to electrical circuit 10, used to power a power supply controller. Circuit 64 is different in that the controller includes a high voltage (HV) pin/source 66. In this implementation, current from the input mains flows through the startup resistor 14 to charge the CVCC capacitor, to start up the controller, only if an internal high voltage (HV) startup transistor 70 (shown in FIG. 10) is turned on. The HV pin 66 is thus used for the initial startup of the controller. The remaining startup and operational behavior of external electrical circuit 64 is similar to that described above for the external electrical circuit 10. The ability to start the controller using high voltage can, in some implementations, result in almost lossless startup.

Figure 10:
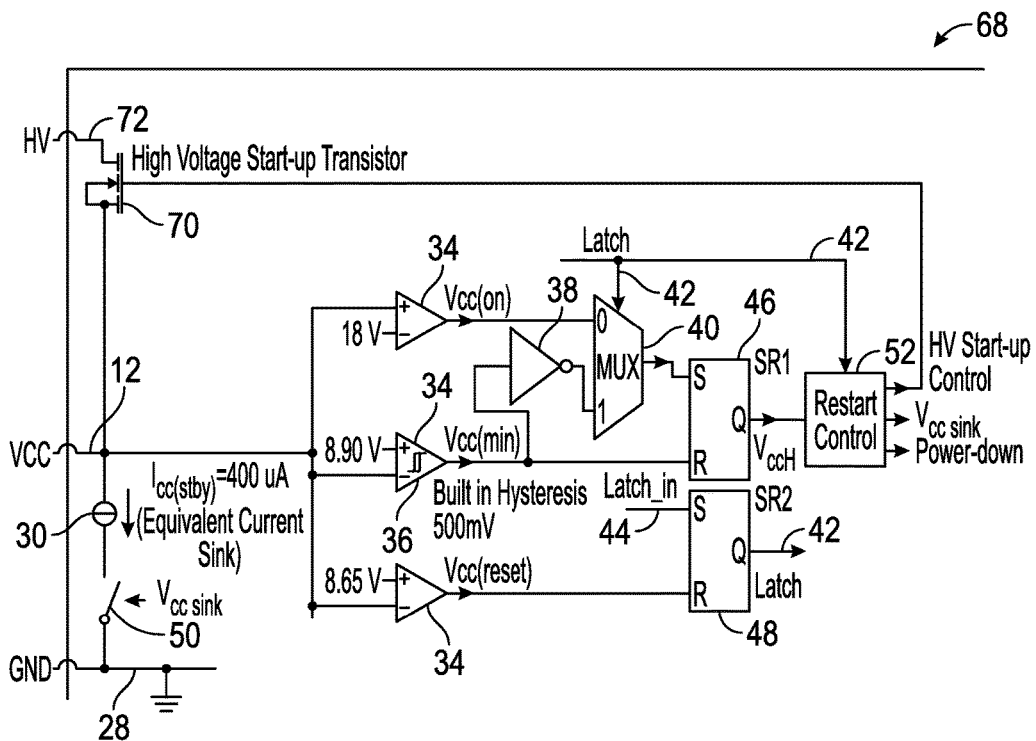
FIG. 10 is a diagram of an implementation of an internal electrical circuit of a power supply controller.

Electrical circuit (circuit) 68, which is internal to the power supply controller, will now be described. As shown in FIG. 10, this circuit is fairly similar to electrical circuit 32 of FIG. 3 except for the presence of the HV pin which is coupled through a high voltage (HV) line 72 to the HV start-up transistor 70. When the controller is in the non-latched state the VCC sink signal is 0, so the switch 50 is open, and the HV start-up transistor 70 is in the OFF state. The DRV pin thus pulses, as normal, to allow the power supply to power the load.

Figure 11:
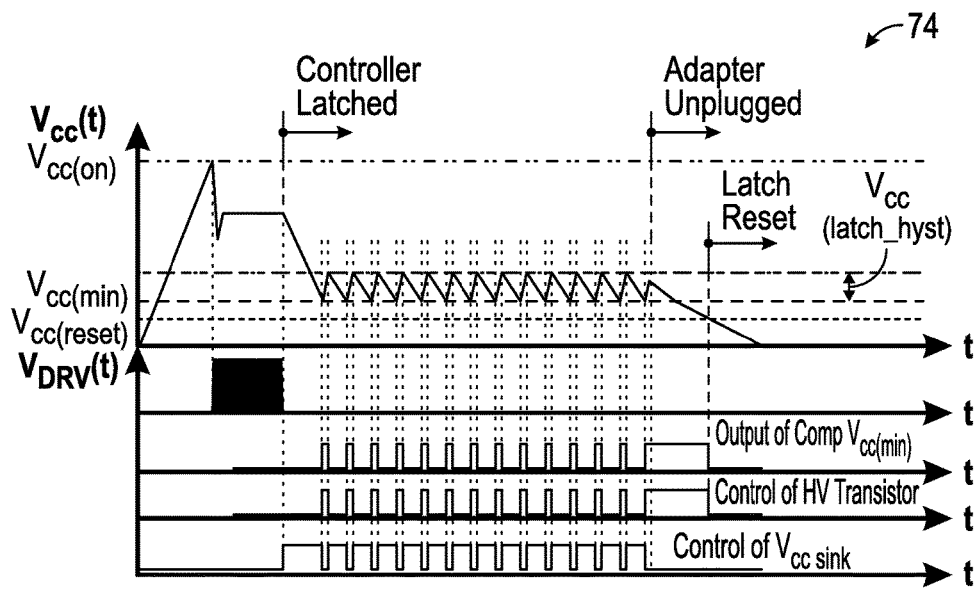
FIG. 11 is a graph illustrating behavior of the electrical circuit of FIG. 10.

When a fault condition occurs, the latch_in signal changes from 0 to 1, and the behavior of circuit 68 follows a sequence somewhat similar to circuit 32. The VCC sink signal and the output of the VCC(min) comparator follow a similar pattern as described above for circuit 32. As shown in FIGS. 10-11, when the VCC(min) comparator outputs a 1 signal due to the VCC voltage dropping below 8.90 V, so that the S and R lines of the SR1 latch are 0 and 1, respectively, the VCCH signal is switched to 0, the restart controller open the switch 50 with the VCC sink signal of 0, and the restart controller also sends an HV start-up control signal of 1 to the HV start-up transistor. This allows the HV pin 66 to couple with the VCC voltage and the VCC voltage rises when the HV transistor is on. When the HV transistor is off the VCC voltage will not rise due to there being no current from the input mains.

Once the VCC voltage rises above 9.40 V, the signal output from the VCC(min) comparator changes to 0 due to the 500 mV built-in hysteresis of the VCC(min) comparator, so that the S and R lines of the SR1 latch are 1 and 0, respectively. The VCCH signal changes to 1, so that the restart controller receives a latch signal 42 of 1 and a VCCH signal of 1. In response, the restart controller turns off the HV start-up transistor by sending it an HV start-up signal of 0 and closes the switch 50 by sending a VCC sink signal of 1 so that the VCC voltage drops again. In this way, the electrical circuit 68 utilizes the HV start-up transistor (which is used in starting up the controller before the auxiliary winding powers the controller) during a latch state to create (or assist with) a repeated hiccup of the VCC voltage. The small hiccup configuration may thus be utilized with a power supply controller having an HV pin configuration (which may, by non-limiting example, have an eight-pin design).

FIG. 11 is a graph 74 showing the behavior of various elements of the electrical circuit 68, including the VCC voltage versus time, the DRV pin output versus time, the VCC(min) comparator output versus time, and the HV start-up control signal (control of HV transistor) versus time, and the VCC sink output signal (control of VCC sink) versus time. For these latter four, the upper value is 1 and lower value is 0. Naturally, however, with this electrical circuit 68 and with all others disclosed herein, the use of a "1" for turning the switch 50 closed, turning the HV start-up transistor 70 on, etc., and a "0" to open the switch 50 and turn off the HV start-up transistor 70, are only representative examples. The restart controller may utilize any signal (and/or any signal type) to achieve the toggling of the switch 50, the HV start-up transistor 70, and/or any other controlled elements.

As can be seen from graph 74, in implementations the output of VCC(min) remains 1 from the last dip to below 8.9 V just before unplugging the power supply until the latch reset voltage of 8.65 V is reached, which causes the HV start-up transistor to be on during this time, but the VCC voltage is drained to 8.65 V due to discharge of the capacitors until, at the latch reset voltage of 8.65 V, the VCC(min) signal returns to 0 and the HV start-up control signal changes to 0, so that the HV start-up transistor is turned off.

Figure 12:
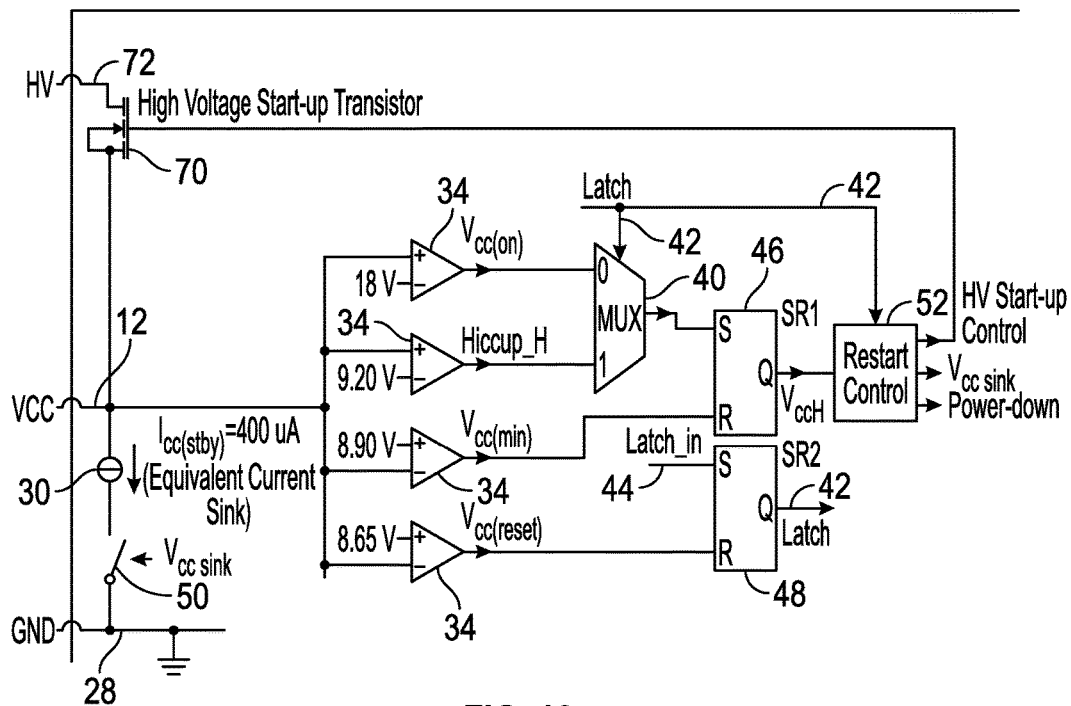
FIG. 12 is a diagram of an implementation of an internal electrical circuit of a power supply controller.

FIG. 12 shows an electrical circuit 76 that is somewhat similar to electrical circuit 68 except that instead of the comparator with hysteresis there are two comparators 34, similar to electrical circuit 60. When the controller is in a non-latched state, the latch_in signal is zero (which latch_in signal, as with other implementations, emanates from internal logic of the controller that will be easily implemented by a practitioner of ordinary skill in the art without further disclosure). The output of the VCC(reset) comparator 34 is 0 because the VCC voltage is greater than 8.65 V. Thus, the S and R lines of SR2 latch are both 0, the latch signal 42 is 0, so the multiplexer allows only the VCC(on) signal through it, which is 0 due to the voltage being lower than 18 V. The S line of the SR1 latch is accordingly 0, and because the VCC voltage is still above 8.90 V, the R line of the SR1 latch is also 0. The VCCH signal is accordingly 0, the latch signal 42 is 0 and, in response to these two signals, the restart controller 52 outputs an HV start-up control signal of 0 (so that the HV start-up transistor 70 is off) and outputs a VCC sink signal of 0 so the switch 50 is in the open configuration, as shown in FIG. 12.

When a fault condition occurs and the controller enters a latched state, the latch_in signal switches to 1, so that the S and R lines of SR2 are 1 and 0, respectively. The latch signal 42 is therefore 1, so that the multiplexer allows the output of the Hiccup_H comparator through it instead, which is 1 due to the VCC voltage being greater than 9.20 V. The S line of SR1 is therefore 1 and the R line of SR1 is still 0, so the VCCH signal changes to 1. The restart controller, in response to receiving a latch signal 42 of 1 and VCCH signal of 1, outputs an HV start-up control signal of 0 to keep the HV start-up transistor off, but outputs a VCC sink signal of 1 to close the switch 50 and begin to decrease the VCC voltage.

When the VCC voltage drops below 9.20 V (but is still above 8.90 V), the Hiccup_H signal changes to 0, so that the S and R lines of the SR1 latch are both 0, which does not change the VCCH signal, so the HV start-up transistor remains off and the switch 50 remains closed so that the VCC voltage continues to drop due to the current sink 30.

When the VCC voltage drops below 8.90 V, the VCC (min) signal toggles to 1, so that the S and R lines of the SR1 latch are 0 and 1, respectively, which resets the SR1 latch so the VCCH signal is 0. The restart controller thus receives the latch signal 42 of 1 and the VCCH signal of 0 and, in response, outputs an HV start-up control signal of 1 to turn on the HV start-up transistor and outputs a VCC sink signal of 0 to open switch 50. During this period the VCC voltage rises. When the VCC voltage rises above 8.90 V the R input of SR1 toggles to 0 but, since the S and R lines are then both 0, the VCCH output does not change. When the VCC voltage rises above 9.20 V, the Hiccup_H signal changes to 1, so that the S and R lines of SR1 are then 1 and 0, respectively, so that the VCCH signal toggles to 1 and the switch 50 is closed, draining the VCC voltage. Thus the VCC voltage undergoes the repeated small hiccup behavior, similar to other controllers described herein.

Figure 13:
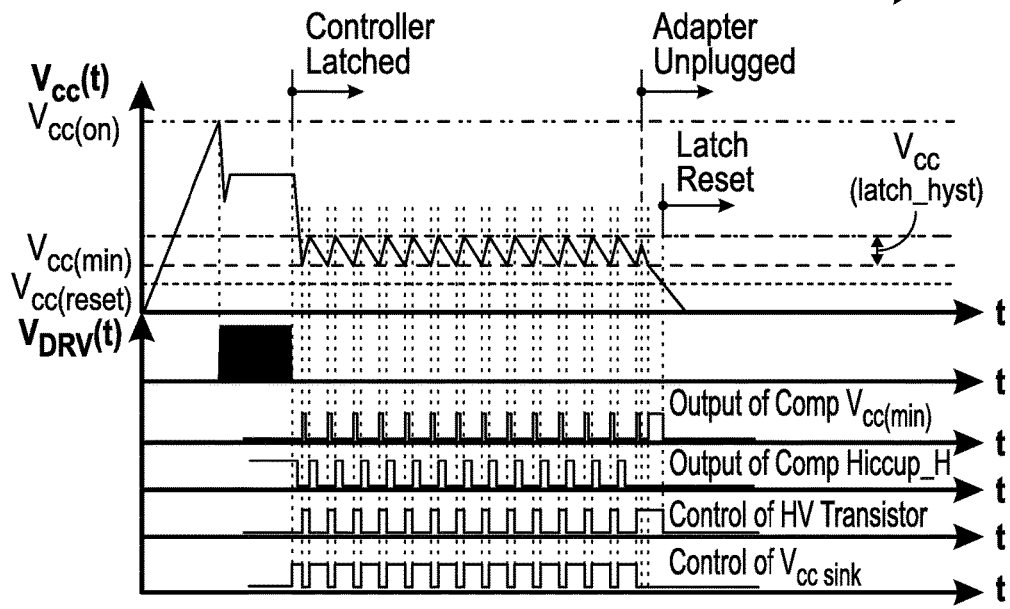
FIG. 13 is a graph illustrating behavior of the electrical circuit of FIG. 12.

The behavior of electrical circuit 76 is represented by graph 78 of FIG. 13, similar to other graphs described above. As can be seen from FIG. 13, in some cases the output signal of the VCC(min) comparator is 1 from the last time the VCC voltage drops below 8.90 V after unplugging the power supply until the VCC voltage drops to the reset value of 8.65 V, at which point the VCC(min) signal changes to 0. The HV start-up control signal may be 1 from the last dip of the VCC voltage below 8.90 V just before unplugging until the voltage drops below the reset value of 8.65V, thus the HV transistor may be on but the VCC voltage will drain from the capacitors draining after unplugging. The VCC sink signal may be 0 (and accordingly the switch 50 open) from the last time the VCC voltage drops below 8.90 V just before unplugging (and may not switch to 1 until after the reset is complete and the controller has started up again, as shown in FIG. 13).

Thus, when the user unplugs the power supply, as has been described above for other implementations, the VCC voltage does not have to drop very far before the restart process begins to reset the controller so that it is not in a latched state. Thus, the controller will reset from the latched state to a non-latched state within only a couple or a few seconds after the user unplugs the power supply.

Figure 14:
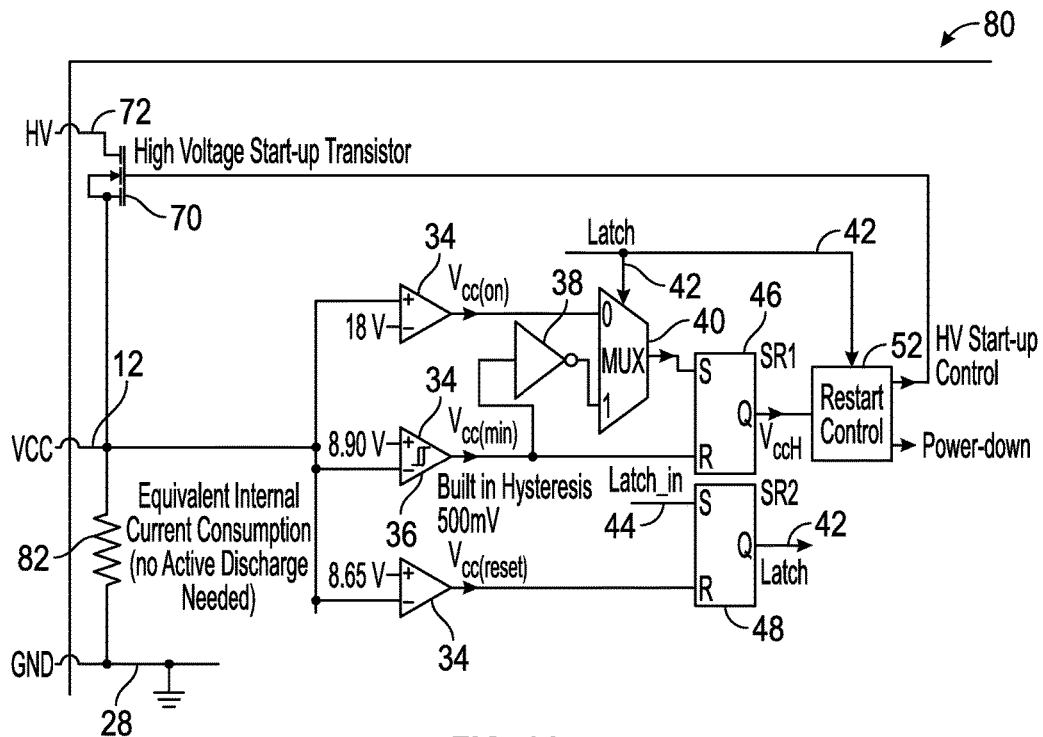
FIG. 14 is a diagram of an implementation of an internal electrical circuit of a power supply controller.
Figure 15:
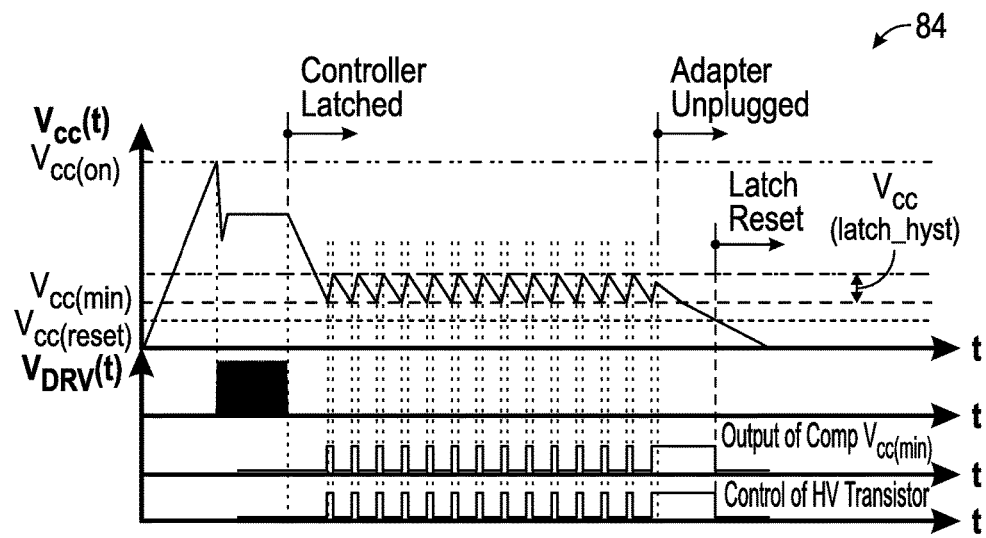
FIG. 15 is a graph illustrating behavior of the electrical circuit of FIG. 14.

The electrical circuit 80, shown in FIG. 14, is identical (and its operation is identical) to electrical circuit 68, except there is no switch 50 and no current sink 30, and the restart controller accordingly does not output a control signal for the switch. Instead, during the draining stage where the HV start-up transistor 70 is turned off, the VCC voltage drops simply due to the internal current consumption of the controller itself due to internal resistance of the power supply controller (modeled/represented by resistor 82). The behavior of electrical circuit 80 is illustrated in graph 84 of FIG. 15, and will be understood by the practitioner of ordinary skill in the art without further explanation in light of the previous explanations.

As can be seen from graph 84, the output signal of the VCC(min) comparator may be 1 from the last time the VCC voltage dropped below 8.9 V just before unplugging until the latch reset voltage of 8.65 V is reached, at which point the VCC(min) signal may change to 0. Correspondingly, the HV start-up control signal may be 1, keeping the HV start-up transistor on, from the last time the VCC voltage dropped below 8.9 V just before unplugging until the latch reset voltage of 8.65 V is reached, at which point the HV start-up control signal may be 0, turning the HV start-up transistor off. The VCC voltage will drain during this time frame due to the capacitors discharging after unplugging.

Figure 16:
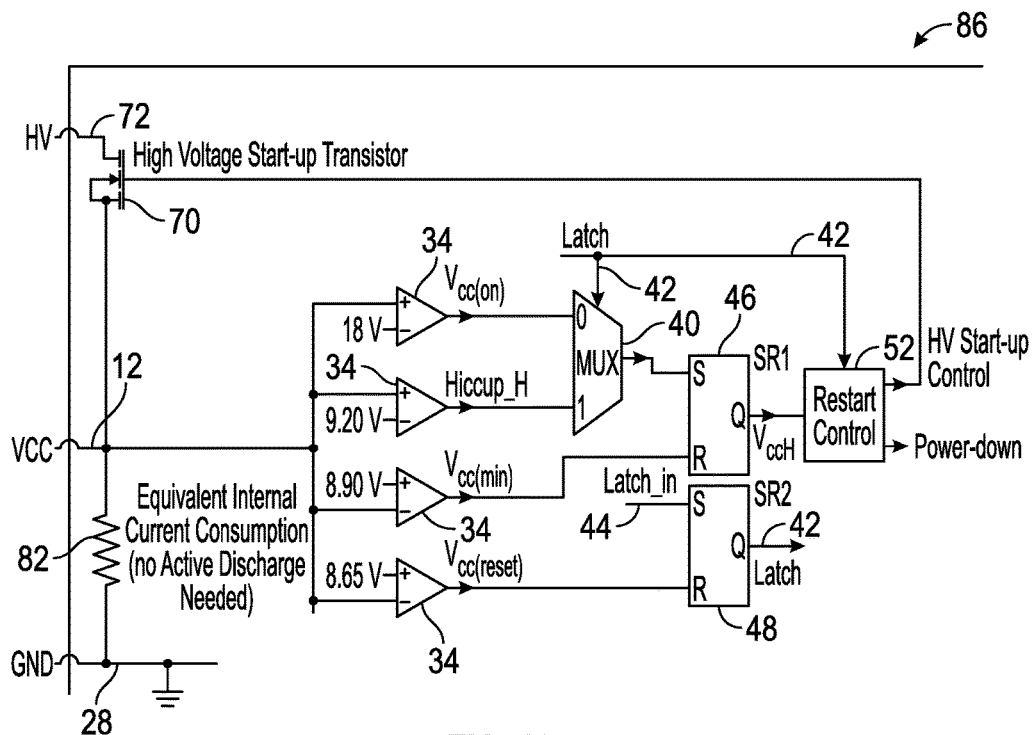
FIG. 16 is a diagram of an implementation of an internal electrical circuit of a power supply controller.
Figure 17:
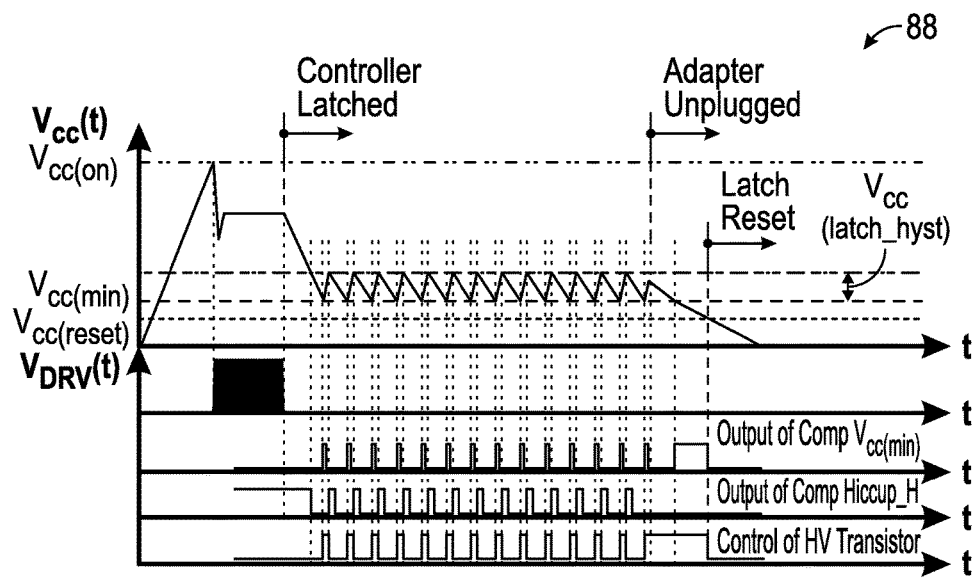
FIG. 17 is a graph illustrating behavior of the electrical circuit of FIG. 16.

The electrical circuit 86, shown in FIG. 16, is identical (and its operation is identical) to electrical circuit 76, except there is no switch 50 and no current sink 30, and the restart controller accordingly does not output a control signal for the switch. Instead, during the draining stage where the HV start-up transistor 70 is turned off, the VCC voltage drops simply due to the internal current consumption of the controller itself due to internal resistance of the power supply controller (modeled with resistor 82). The behavior of electrical circuit 86 is illustrated in graph 88 of FIG. 17.

As can be seen from graph the output of the VCC(min) comparator may be 1 from the point after unplugging at which the VCC voltage drops below 8.90 V until the VCC reset voltage of 8.65 V is reached. The HV start-up control signal may be 1 from the last dip to below 8.9 V on the VCC rail just before unplugging until the VCC voltage drops to the reset level of 8.65 V and the signal changes to 0. Thus the HV start-up transistor will be on during the last draining period and the VCC voltage will be draining due to the discharging of the capacitors.

Another version of a power supply controller may be implemented which uses a comparator with built-in hysteresis, as discloses with respect to other controllers, and that has a switch controlled with a VCC sink signal, a HV start-up transistor controlled with an HV start-up control signal, and additionally undergoes internal current consumption when the HV start-up transistor is off, to drain the VCC voltage, even if the switch 50 is open (this may be modeled as a resistor in parallel with the ICC current sink/switch 50). In such an implementation the VCC(min) comparator output signal may be at zero during DRV switching and, after the latched state is entered and the VCC voltage drops to below 8.90 V, the VCC(min) signal switches to 1, switching back to 0 when the VCC voltage rises above 9.40 V (due to 500 mV built-in hysteresis), and thus toggling back and forth. The VCC (min) comparator signal switches to 1 when the VCC voltage drops below 8.9 V for the last time before the power supply is unplugged, and then remains at 1 until the VCC voltage drops to the reset value of 8.65V, at which point the VCC(min) comparator signal switches to 0. The HV start-up control transistor signal value mimics the VCC (min) comparator output signal at all times due to the circuit design. However, in this case the VCC sink signal switches to 1 when the controller first enters the latched state and until the VCC voltage drops to below 8.90 V, but then switches to 0 and remains at 0 for the rest of the latched state and even during and after reset (until another latched state is entered). Thus the current sink operated by the switch 50 in such an implementation is only closed and draining the VCC voltage through the current sink during the initiation of the latched state. During all other draining times the draining of the VCC voltage occurs only from the HV start-up transistor being off and through internal current consumption of the controller. Thus the small hiccup is created only by the HV start-up transistor and the internal current consumption of the controller.

As may be envisioned, a controller similar to the one described immediately above may be altered by using a four comparator design instead of including a comparator with built-in hysteresis. In such an implementation the output signal of the VCC(min) comparator, the output of the Hiccup_H comparator, and the HV start-up control signal will be identical as shown and described in graph 78 with respect to circuit 76, the only difference being that, as with the version immediately described above, the switch 50 will not be toggled open and closed during the voltage hiccupping, but instead will only be closed when the latched state is first entered, and will then be closed when the voltage drops to below 8.90 V, but will then remain closed thereafter—the small hiccup behavior thus accomplished only through the control of the HV start-up transistor and the internal current consumption of the controller, as described with respect to the circuit implementation immediately above.

The power supply controllers disclosed herein may be useful for realizing a short reset time for a latch state without having to detect when a power supply has been unplugged. The comparators disclosed for each power supply controller implementation may also be used in the controller start-up/turn-off logic so that they fulfil multiple roles and so that no additional comparators have to be added to the electronic circuit than those that would have already been in the circuit to begin with.

Several power supply controllers disclosed herein do not include a Zener diode. Power supply controllers that include a Zener diode coupled with the supply voltage VCC rely on the Zener diode providing a clamp voltage during a latched state. In such a solution there is a current dependency of clamp voltage during the latched state, and this is a limiting factor for designers of an SMPS because it forces one to choose between a fast start-up time for the SMPS or a fast reset time for the SMPS. The absence of a Zener diode for the power supply controllers disclosed herein allows both a fast startup time and a fast resent time. Further, for conventional power supply controllers which utilize a Zener diode, a current ICC will be different when the power supply is used in countries with different mains voltages of 110 V AC or 230 V AC and in such cases the reset time will be dependent on mains voltage. In power supply controllers disclosed herein that dependency may be eliminated, so that the reset time is independent of input voltage (input current). Dependency on input current has been observed to have undesirable effects in some power supply controllers.

Power supply controllers using comparators instead of a Zener diode may also show increased accuracy. The long reset times for conventional power supply controllers are, in some cases, due at least in part to trends in switched-mode power supplies to have lower power consumption overall. Thus for conventional power supply controllers, a designer is forced to decide between lower power consumption or a shorter reset time. The power supply controllers disclosed herein in implementations shorten the reset time without increasing power consumption and without increasing die size.

Implementations of power supply controllers disclosed herein may be configured to hiccup between a lower voltage and an upper voltage within a design specified amount of time. Implementations of power supply controllers disclosed herein may be configured to drain to a restart voltage within a specified amount of time less than three seconds. The small hiccup configuration described herein could be used for controllers with a startup resistor connected to the mains and/or with circuits with a high voltage (HV) start-up transistor integrated inside the controller, and so forth, as described herein.

It will be noted that in some implementations herein the latch_in signal has been described as being a constant signal of 1 when the controller is in a latched state and a constant signal of 0 when the controller is in a non-latched state. As described to some extent above, however, in some cases the latch_in signal is simply a short impulse of 1 when the controller enters the latched state, and the latch elements (SR latches) and other components may be configured to appropriately output the proper signals and control the various elements of the controller as desired, which will be understood by the practitioner of ordinary skill in the art.

When the small hiccup behavior is implemented using the HV start-up circuitry of a controller this may achieve a low consumption (or the lowest possible consumption).

In places where the description above refers to particular implementations of power supply controllers and related methods and implementing components, sub-components, methods and sub-methods, it should be readily apparent that a number of modifications may be made without departing from the spirit thereof and that these implementations, implementing components, sub-components, methods and sub-methods may be applied to other power supply controllers and related methods.

What is claimed is:

1. A power supply controller, comprising:
at least three comparators, each comparator of the at least three comparators comprising an input coupled with a supply voltage of a power supply controller;
a multiplexer coupled to the at least three comparators;
at least two latches coupled with the at least three comparators; and
a restart controller comprising an input coupled with an output of a latch of the at least two latches.

2. The power supply controller of claim 1, wherein the restart controller is configured to alternately decrease and increase the supply voltage, respectively, to create a repeated voltage hiccup of the supply voltage when the power supply controller is in a latched state.

3. The power supply controller of claim 1, wherein the at least three comparators comprise four comparators.

4. The power supply controller of claim 3, wherein an output of a first comparator is directly coupled with a first input of the multiplexer, an output of a second comparator is coupled with a second input of the multiplexer, an output of a third comparator is coupled with an input of a first latch of the at least two latches, and an output of a fourth comparator is coupled with an input of a second latch of the at least two latches.

5. The power supply controller of claim 1, wherein the at least three comparators comprise no more than three comparators.

6. The power supply controller of claim 5, wherein one of the at least three comparators comprises a built-in hysteresis.

7. The power supply controller of claim 5, further comprising an inverter coupled between one of the at least three comparators and the multiplexer.

8. The power supply controller of claim 1, further comprising a switch configured to be toggled by the restart controller between a closed state and an open state to alternately decrease and increase the supply voltage.

9. The power supply voltage of claim 1, further comprising a voltage start-up transistor configured to be toggled by the restart controller between an on state and an off state to alternately couple and decouple a voltage source with the supply voltage to alternately increase and decrease the supply voltage.

10. The power supply controller of claim 1, wherein the power supply controller does not comprise a Zener diode coupled with the supply voltage of the power supply controller.

11. The power supply controller of claim 1, wherein the multiplexer is controlled by an output signal of a second latch of the at least two latches.

12. A power supply controller, comprising:
- a first comparator, a second comparator, and a third comparator each comprising an input coupled with a supply voltage of a power supply controller;
- a multiplexer with a first input coupled with an output of the first comparator, the multiplexer also comprising a second input coupled with an output of the second comparator;
- a first latch comprising a first input coupled with an output of the multiplexer, the first latch also comprising a second input coupled with an output of the second comparator;
- a second latch comprising an input coupled with an output of the third comparator; and
- a restart controller comprising an input coupled with an output of the first latch.

13. The power supply controller of claim 12, wherein the second input of the multiplexer is coupled with the output of the second comparator through an inverter, the inverter receiving a signal from the second comparator and outputting an inverted signal to the multiplexer.

14. The power supply controller of claim 12, wherein the second comparator comprises a built-in hysteresis.

15. The power supply controller of claim 12, further comprising a switch configured to be toggled by the restart controller between a closed state and an open state to alternately decrease and increase the supply voltage.

16. The power supply voltage of claim 12, further comprising a voltage start-up transistor configured to be toggled by the restart controller between an on state and an off state to alternately couple and decouple a voltage source with the supply voltage to alternately increase and decrease the supply voltage.

17. A power supply controller, comprising:
- a first comparator, a second comparator, a third comparator, and a fourth comparator each comprising an input coupled with a supply voltage of a power supply controller;
- a multiplexer with a first input coupled with an output of the first comparator, the multiplexer also comprising a second input coupled with an output of the second comparator;
- a first latch comprising a first input coupled with an output of the multiplexer, the first latch also comprising a second input coupled with an output of the third comparator;
- a second latch comprising an input coupled with an output of the fourth comparator; and
- a restart controller comprising an input coupled with an output of the first latch.

18. The power supply controller of claim 17, wherein the restart controller is configured to alternately decrease and increase the supply voltage, respectively, to create a repeated voltage hiccup of the supply voltage when the power supply controller is in a latched state.

19. The power supply voltage of claim 17, further comprising a voltage start-up transistor configured to be toggled by the restart controller between an on state and an off state to alternately couple and decouple a voltage source with the supply voltage to alternately increase and decrease the supply voltage.

20. The power supply controller of claim 17, wherein the multiplexer is controlled by an output signal of the second latch.

* * * * *